Figure 1:
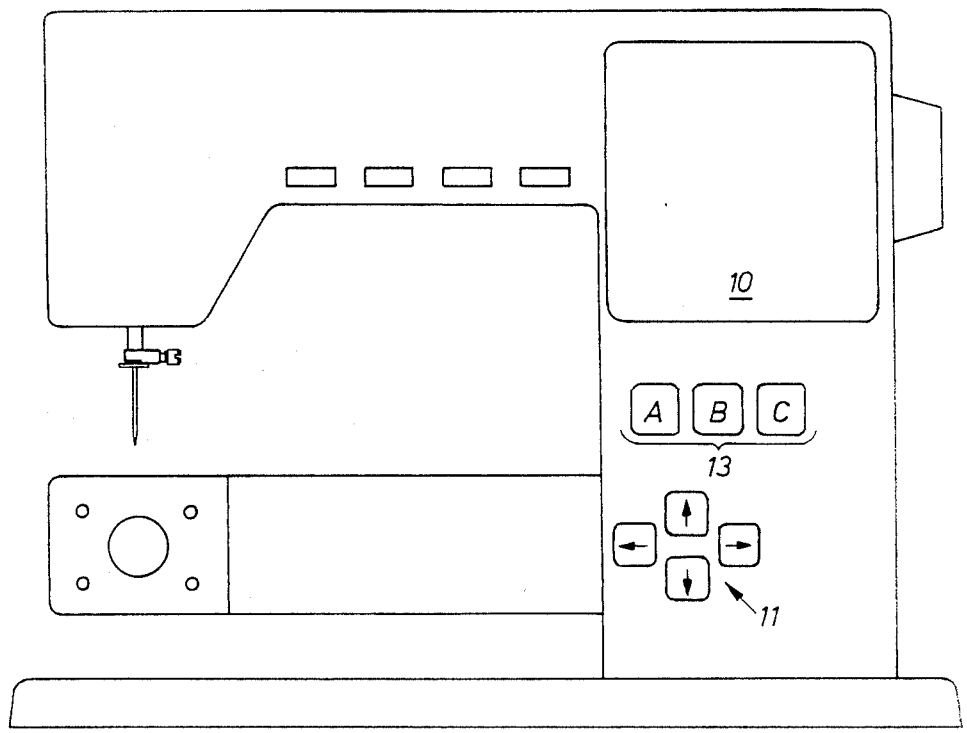

United States Patent [19]

Skogward

[11] Patent Number: 4,860,678
[45] Date of Patent: Aug. 29, 1989

[54] SEWING MACHINE WITH GRAPHIC INSTRUCTIONS

[75] Inventor: Kenneth O. E. Skogward, Huskvarna, Sweden

[73] Assignee: Husqvarna Aktiebolag, Huskvarna, Sweden

[21] Appl. No.: 253,049

[22] Filed: Oct. 4, 1988

[30] Foreign Application Priority Data

Oct. 5, 1987 [SE] Sweden .............................. 8703830

[51] Int. Cl.$^4$ .............................................. D05B 3/02
[52] U.S. Cl. ................................... 112/445; 112/458; 112/121.11
[58] Field of Search ............... 112/445, 444, 456, 458, 112/457, 121.11, 121.12

[56] References Cited

U.S. PATENT DOCUMENTS

| | | | |
|---|---|---|---|
| 4,331,089 | 5/1982 | Widmer | 112/445 X |
| 4,622,907 | 11/1986 | Kimura | 112/121.12 |
| 4,662,295 | 5/1987 | Bergvall | 112/445 |
| 4,688,503 | 8/1987 | Kato | 112/445 |

*Primary Examiner*—Peter Nerbun
*Attorney, Agent, or Firm*—Pearne, Gordon, McCoy & Granger

[57] ABSTRACT

This invention is based on an idea of an electronic sewing machine where most controls in earlier machines have been replaced by a combined control (11,13) consisting of an arrangement for guiding a cursor on a graphic screen (10) built into the machine as well as an activation device (13). The graphic screen is the unit talking to the operator by means of pictures or texts on different menus (complete screen pictures) and describing the functions performable by the machine. The graphic screen also functions as a listener. The operator guides the cursor so that it points at a field which e.g. consists of a picture or a text and simultaneously he activates the activation device. Then the operation, particular for this very field, is carried out. Via software an arbitrary number of menus are created which consist, in their turn, of activation fields by which the operator communicates with the machine. These menus and fields, which either are pictures or texts, are thus created that they by way of the software lead and instruct the operator in a pedagogic and logical way as far as the work with the machine is concerned. Taking away hardware controls and replacing them by software ones, as described before, offer immensely great possibilities for creating a user-friendly communication between the machine and the operator.

8 Claims, 2 Drawing Sheets

SEWING MACHINE WITH GRAPHIC INSTRUCTIONS

The present invention relates to an electronic, computerized sewing machine with a graphic display on the front side of the machine on which the operator can survey different functions as well as control the machine in a simple and logical way.

It is previously known to use built-in units for electronic sewing machines while pre-programming of seams chosen by the electronics of the machine takes place on indication from the operator. Such a machine is known from e.g. the Swedish patent specification No. SE-P-7910201-8 which once constituted a large step towards simpler handling of sewing machines. By means of still more developed electronics and, above all, cheaper components, ways are, however, being opened for further developing electronic sewing machines, primarily by utilizing a graphic screen with an activation device enabling the operator to control the functions of the machine. In such a system the largest part of the operating manual of the machine can be put in and selectively made visible on the screen which thus gets the function of an operating manual of the machine.

By the invention an electronic sewing machine is provided in which most controls have been replaced by a combined control constituting an arrangement for guiding a cursor on a graphic screen built into the machine and an input device by which the commands are given to the sewing machine. The graphic screen is a means of communication between the machine and the operator and is so designed that it gives as well as receives information. Via software an arbitrary number of "menus" has been created containing activation fields by which the operator communicates with the machine. These menus and fields with text and pictures are so designed that, by way of software, they lead the operator pedagogically and logically to a correct seam choice with regard to the working material and the sewing operation.

The substitution of a "software control" on the machine for a manual control has opened great possibilities to create a modern and easy communication between the operator and the machine.

Figure 2:
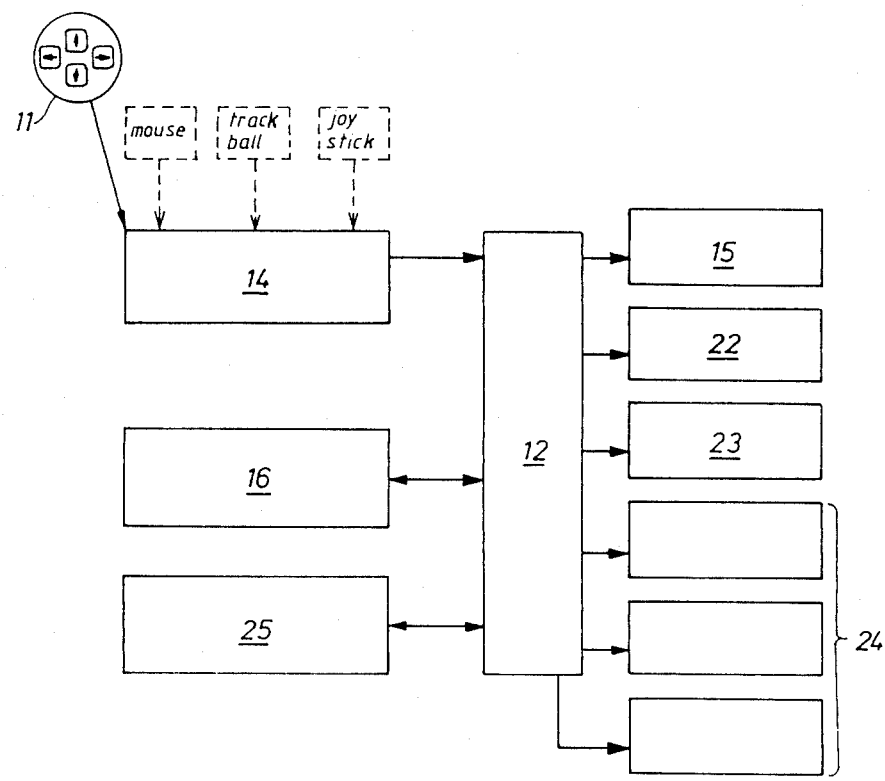

An embodiment of a sewing machine according to the invention is described in the following with reference to attached drawings that show in:

FIG. 1 a vertical projection of a sewing machine from the front,

FIG. 2 a block diagram of modules included in the electronic system of the machine.

Figure 4:
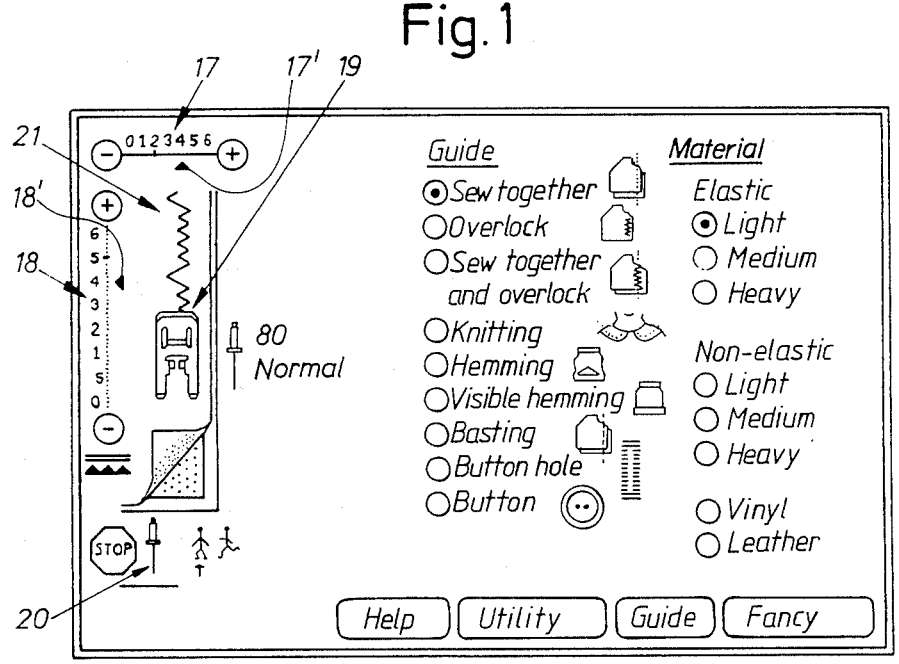
Figure 3:
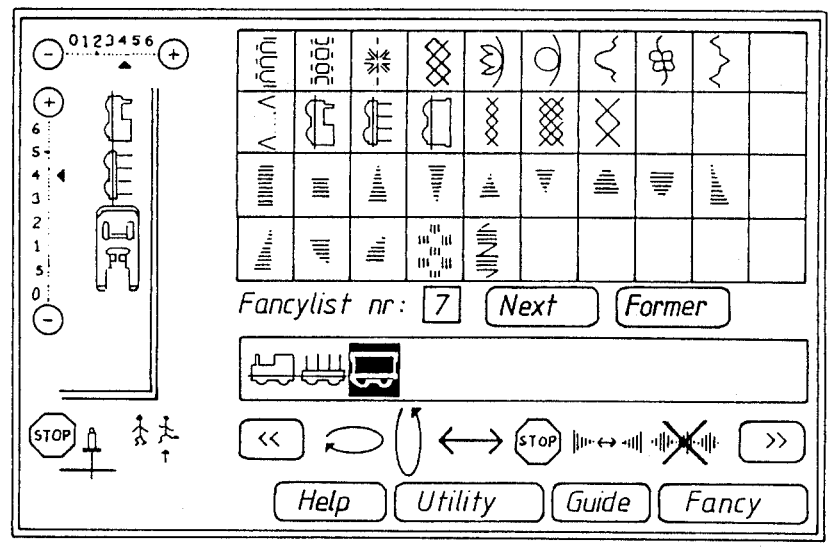

FIG. 3 a display on the front side of the machine,

FIG. 4 a variation of the display.

In FIG. 1 is thus illustrated a front side of a sewing machine where a large part of the panel is covered by a display 10 as well as control means 11 for it.

A display is a presentation unit where a large number of points can be activated and deactivated, whereby seam pictures, symbols, text etc. are presented. A display is in its simplest form built up by a couple of glass disks on which points in the form of transparent foils are applied and divided by liquid crystal (LCD). In order to supply voltage to the points a wire pattern is required on the disks. Such a pattern has horizontal as well as vertical wires which have connections on the disk edges to a so-called multiplex system in which positive and negative pulses are generated to the relevant points of the display, which points appear on the display as long as the voltage is applied. The mode of operation of such a display, chosen as an example, is further described in U.S. Pat. No. 4,662,295 assigned to the assignee of the present invention, being referred to in this connection.

The display of the sewing machine is common for several functions, e.g. the selection of programmed seams in a microprocessor 12 of the machine is shown, and a so-called sewing guide with schedules for utility and fancy seams, respectively, is also illustrated. When it is desired to choose the function (menu) of the display or to give it an instruction, some of the switches 13 on the panel are used which constitute the activation device by which the operator controls the machine. The display may be manufactured in liquid crystal techniques, electro-luminescence or vacuum-fluorescence techniques.

The connection of the display to the electronic system of the sewing machine is shown in FIG. 2. The operating unit 11 is illustrated as four push-buttons, each having an arrow by which it is possible to move the cursor on the display in the direction desired. A joy stick, mouse, or track ball can alternately be used as the operating unit as shown in FIG. 2. The operating unit is included in a module 14 which transmits and converts the signals of the push-buttons to the microprocessor 12. At the outlet of the microprocessor there is a control and drive module 15 for the display. Those modules 14 and 15 and the connection via the processor constitute a cursor control device which is a usual arrangement on computers of different kinds. A display program for showing functions, menus etc. on the screen is collected in a special module 16 connected to the processor 12 and the switches 13. The program is stored in a ROM giving multiplex signals to the screen, which signals are dependent on a stepping in the program effected by means of the relevant switch 13. A picture on the screen can look as illustrated in FIG. 3.

A sewing guide has previously been described in the Swedish patent specification No. SE-P-7910201-8. The sewing machine described in that Specification has a seam selector control and a so-called cloth control. The reason for introducing the cloth control is that different structures or qualities of sewing material require quite different settings of the machine, even though one and the same sewing operation shall be carried out. When the cloth control has been set with respect to cloth structures and thickness, a starting address word for a seam is electronically produced by means of a computer (width and feed), which word empirically turns out to be suitable for the material concerned. Stitch codes for such a seam are read in advance into an arranged stitch memory (ROM) of the processor and the starting address word sets a counter, belonging to the memory, on the relevant seam. When setting on other cloth structures or another sewing operation, address words are produced corresponding to these settings and they release another seam etc. A type of such a seam guide is described in detail in the said Swedish patent specification to which reference is made.

The display with its picture (FIG. 3) and cursor as well as the modules (FIG. 2) include an input selector to a sewing machine having a microprocessor for the functions described in the said Swedish patent specification. The picture in FIG. 4 belongs to the menu "sew together" and shows the parameters "guide" and "material" as well as some fields for zigzag width 17, feed length 18, presser foot 19 and needle position 20 etc.

The operator can, in this case, by means of the push-buttons 11, have the cursor scan parameters and the fields as well as change menu with the relevant switch 13 and also activate the processor so that a starting address word is put into its stitch memory relating to a seam that fits the sewing concerned as previously described. The parameter "material" is handled as a cloth control and "guide" as a function control. The scales 17, 18 for width and length, respectively, can also be scanned by the cursor and the Pointers 17' and 18' are moved by the cursor to the position wanted and fixed by one of the switches 13. When all settings have been made, a seam picture 21 on the screen shows what the real seam will look like. When the machine is started and operated by means of the foot control, this seam is carried out as the code words for zigzag and feed are supplied from the processor to the zigzag and feed modules 22, 23 which guide the zigzag movement as well as the setting of the feed unit.

As is shown in FIG. 2 several modules 24 can be connected to the processor for effecting various desirable functions of the machine. One can be used for so-called stop-right, i.e. positioning the needle in the top or the bottom position when stopping the machine. Another one can be a thread tension control setting the correct upper thread tension for the seam picture wanted. An external memory 25 with write and read function RAM is also a property increasing the working capacity of the machine.

I claim:

1. A sewing machine with graphic instructions provided with a needle bar mechanism, a cloth feeder and a computer (12) with a memory unit for producing stitch codes for control of the needle bar mechanism as well as the cloth feeder, and an arranged display (10) connected to the computer, which display has a module (16) for showing at least seam pictures, symbols, and accessories, characterized in that an operating unit (11) is attached to a control module (14) for a cursor on said display and that a picture shown on said display is divided in fields illustrating each of the said seam pictures, symbols and accessories between which the cursor is dirigible, and that those fields together with the cursor and an activation arrangement (13) constitute an input selector of the machine.

2. A sewing machine according to claim 1, characterized in that the operating unit is a set of push-buttons.

3. A sewing machine according to claim 2, characterized in that the operating unit comprises both a scanning arrangement controlled by the operator for the cursor on the display and a switching device for producing starting address words to the computer representing the sewing operation and working material.

4. A sewing machine according to claim 1, characterized in that the display module includes a memory unit for showing several menus on the display with seam pictures for utility seams and fancy seams.

5. A sewing machine according to claim 4, characterized in that the activation device includes a switching arrangement for change of menus on the display.

6. A sewing machine according to claim 1, characterized in that the operating unit is a mouse.

7. A sewing machine according to claim 1, characterized in that the operating unit is a track ball.

8. A sewing machine according to claim 1, characterized in that the operating unit is a joy stick.

* * * * *